United States Patent [19]

Ledenican

[11] 4,095,361
[45] Jun. 20, 1978

[54] DISPLAY FRAME

[76] Inventor: Robert Louis Ledenican, 710 Hemlock Dr., Euclid, Ohio 44132

[21] Appl. No.: 780,794

[22] Filed: Mar. 24, 1977

[51] Int. Cl.[2] ............................................. G09F 1/12
[52] U.S. Cl. ...................................... 40/152; 403/402
[58] Field of Search ............... 40/152, 152.1, 155; 403/401, 402, 403

[56] References Cited

U.S. PATENT DOCUMENTS

| | | | |
|---|---|---|---|
| 1,934,532 | 11/1933 | Hallowwell | 40/152.1 |
| 3,529,653 | 9/1970 | Fey | 160/378 X |
| 3,599,361 | 8/1971 | Bowman | 40/156 |
| 3,883,974 | 5/1977 | Ashton | 40/152 |
| 4,024,659 | 5/1977 | Ingerdahl | 40/155 |

FOREIGN PATENT DOCUMENTS

| | | | |
|---|---|---|---|
| 201,808 | 1/1959 | Austria | 40/155 |
| 2,307,499 | 12/1976 | France | 40/155 |

*Primary Examiner*—Louis G. Mancene
*Assistant Examiner*—Wenceslao J. Contreras
*Attorney, Agent, or Firm*—Fay & Sharpe

[57] ABSTRACT

A display frame for holding a flat member includes a holding frame portion having a separable frame portion separably secured thereto in a manner permitting separation only by an authorized person having a special tool. The holding frame portion includes a slideway for receiving peripheral portions of a flat member and has a slideway entrance normally closed by the separable frame portion. The separable frame portion is separably secured to the holding frame portion by separable joints, at least one of which includes a locking member completely concealed within the frame and having a movable latch portion yieldably urged to a locked position, and being movable to a released position. A limited access opening through the frame near the locking member provides access to its latch portion with a special tool for moving same to its released position. Separation of the separable frame portion from the holding frame portion opens the slideway entrance and allows removal of the flat member from the slideway in the holding frame portion.

18 Claims, 8 Drawing Figures

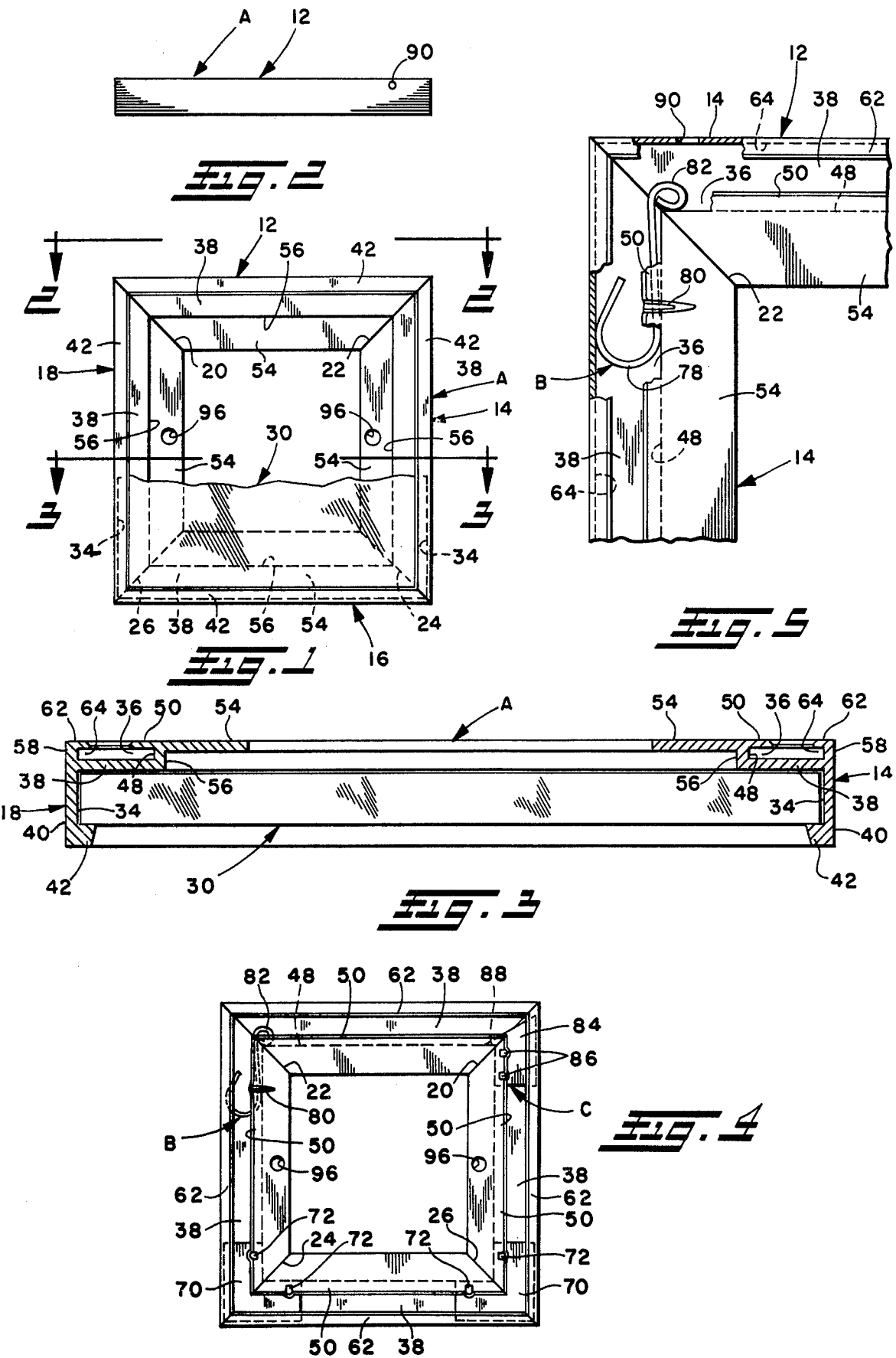

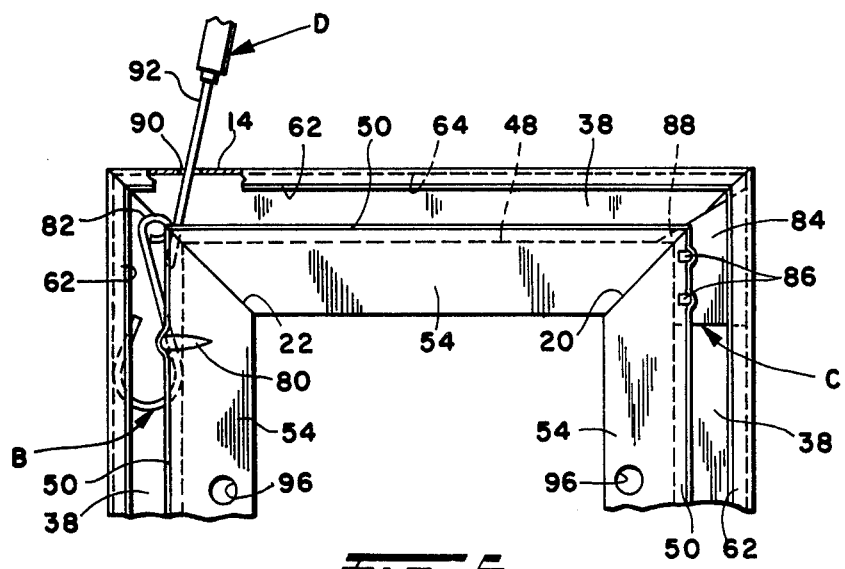
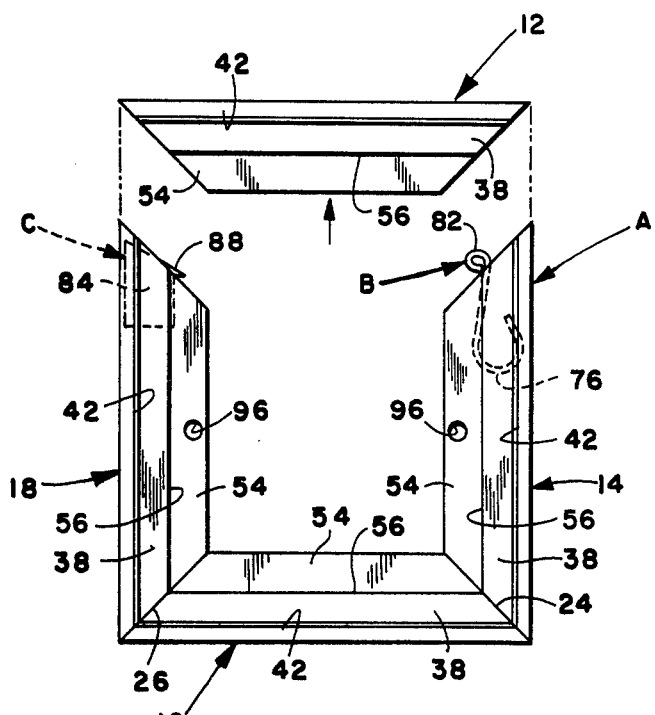
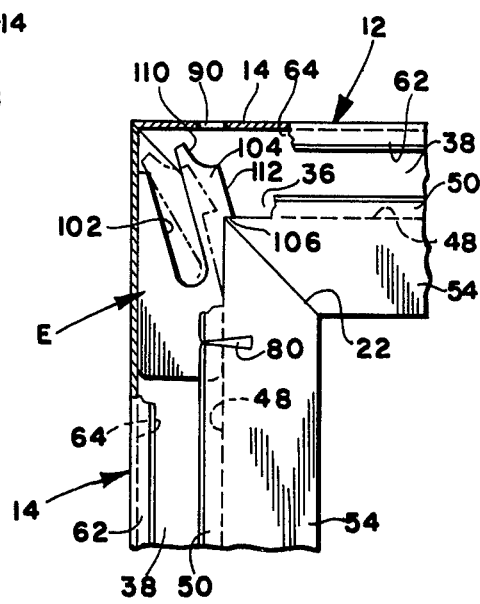

DISPLAY FRAME

BACKGROUND OF THE INVENTION

This application pertains generally to the art of display holders and, more particularly, to such holders in the form of a rectangular frame for displaying cards, posters and pictures or the like.

Display cards, posters and pictures or the like are commonly mounted in display frames which can be taken apart for changing the card, poster or pictures. For example, large office buildings commonly have information display cards mounted in frames at many different locations throughout the building. A plurality of information display cards may be mounted in a common frame on each floor adjacent the elevators. The display cards may carry room numbers, names or other information. Buildings may also have one or more display cards secured to a wall or door for each office. Movement of tenants requires changing of the display cards.

Posters or advertising cards are also commonly mounted in frames which can be taken apart so the advertising can be changed periodically. Pictures of various types are also mounted in separable frames for changing of the pictures at desired intervals.

In display frames of the type described, vandalism is a serious problem when the frame can be readily disassembled by anyone because the display cards, posters and pictures are stolen, and pieces of the frame may also become lost. If the frame is mounted to a wall or other planar surface for easy removal thereof, the entire frame and its contents may be stolen.

Therefore, it is desirable to have a display frame which cannot be easily removable from the planar surface to which it is mounted, and which cannot be easily disassembled except by an authorized person having a special tool. At the same time, it is desirable to provide a display frame which is aesthetically pleasing and is relatively inexpensive to manufacture.

SUMMARY OF THE INVENTION

A display holder for cards, posters and pictures or the like includes a frame having a separable frame portion releasably secured to a holding frame portion by separable joints which include locking members completely concealed within the frame. An authorized person can release at least one locking member by inserting a special tool through a limited access opening in a wall of the frame.

In a preferred arrangement, the frame is generally rectangular and has a generally U-shaped holding frame portion including a slideway for slidably receiving peripheral portions of a flat member. The slideway has a slideway entrance between the legs of the holding frame portion and the entrance is normally closed by the separable frame portion. Locking members secured to the legs of the holding frame portion have latch portions extending outwardly of the leg ends toward one another. At least one latch portion on one locking member is movable to a released position away from the latch portion on the other locking member for allowing separation of the separable frame portion from the holding frame portion.

The holding frame portion preferably includes mounting means integral therewith for mounting same to a wall or other planar surface. The mounting means is normally inaccessible behind a flat member positioned in the holding frame portion.

The locking members for securing the separable frame portion to the holding frame portion are preferably of a nonthreaded type. In addition, the locking members are such that at least one must be released before separation of the separable frame portion or the locking members will be substantially destroyed by permanent deformation of their latch portions.

It is a principal object of the present invention to provide an improved display frame for cards, posters and pictures or the like.

It is also an object of the invention to provide a display frame which can be readily disassembled by an authorized person.

It is an additional object of the invention to provide a separable display frame which is very inexpensive to manufacture and assemble.

It is a further object of the invention to provide a separable display frame which is aesthetically pleasing and wherein the nature of its separability cannot easily by detected.

BRIEF DESCRIPTION OF THE DRAWING

The invention may take physical form in certain parts and arrangements of parts, a preferred embodiment of which will be described in detail in this specification and illustrated in the accompanying drawings which form a part thereof and wherein:

FIG. 1 is a front elevational view of a display frame constructed in accordance with the present invention;

FIG. 2 is a top plan view taken generally along lines 2—2 of FIG. 1;

FIG. 3 is a cross-sectional elevational view taken generally along lines 3—3 FIG. 1;

FIG. 4 is a rear elevational view of the frame of FIG. 1;

FIG. 5 is a partial rear elevational view of the frame and with portions cut away for ease of illustration;

FIG. 6 is a rear elevational view of the frame showing a tool being used to release a locking member;

FIG. 7 is a front elevational view showing the frame with a separable frame portion completely separated from a holding frame portion; and, FIG. 8 is a partial rear elevational view similar to FIG. 5 but showing another form of locking member.

DESCRIPTION OF PREFERRED EMBODIMENTS

Referring now to the drawings wherein the showings are for purposes of illustrating the preferred embodiment of the invention only and not for purposes of limiting same, FIG. 1 shows a display holder for cards, posters and pictures or the like in the form of a substantially rectangular frame A formed by a plurality of individual frame members 12, 14, 16 and 18 connected together at 45° corner miter joints 20, 22, 24 and 26. A portion of a flat member held by frame A is generally indicated by numeral 30.

Frame members 14, 16 and 18 cooperate to define a substantially U-shaped holding frame portion, while frame member 12 defines a separable frame portion separably connected to the holding frame portion. Frame members 14 and 18 define the spaced-apart legs of the U-shaped holding frame portion, while frame member 16 defines the base thereof.

Each individual frame member 12, 14, 16 and 18 has the same cross-sectional size and shape. Therefore, common numerals will be used for illustrating each detailed feature of all the frame members. It will be recognized that the individual frame members may have different lengths, particularly in pairs, depending upon the shape of the frame. For example, frame members 14 and 18 will normally be the same length, as will frame members 12 and 16. Each opposite pair of frame members can be of a different length with respect to the other opposite pair of frame members depending upon whether the frame is vertically elongated or horizontally elongated. In the arrangement shown in FIG. 1, the frame is square and all of the frame members are of the same length.

With reference to FIG. 3, each individual frame member includes a front outer channel 34 and a rear inner channel 36 positioned in opposed relationship on opposite sides of a web 38, and opening toward one another parallel to web 38. Front outer channel 34 has a base defined by a base portion 40 extending perpendicular to web 38 and having a flange 42 extending inwardly from its outer end parallel to web 38. Rear inner channel 36 has a base 48 and a channel leg 50 extending parallel to web 38. A frame plate portion 54 is stepped from web 38 toward the side thereof on which rear inner channel 36 is located to define a recess 56. A flange 58 extends outwardly from web 38 on the same side thereof as rear inner channel 36 and is spaced from rear inner channel 36 toward outer channel 34. Flange 58 extends outwardly from web 38 a distance approximately at least as great as the width of rear inner channel 36. In the preferred arrangement shown, flange 58 actually forms a continuation of base portion 40 and has a leg 62 extending inwardly therefrom parallel to web 38 to define a rear outer channel 64 directly opposed to rear inner channel 36. The outer surfaces of frame portions 50, 54 and 62 facing away from web 38 all lie in a common plane to define a rear surface of the frame member and this rear surface is normally in engagement with a planar surface to which the frame is mounted. It will be recognized that extensions can extend outwardly from frame portions 50, 54 and 62 for engagement with the planar surface to which the frame is mounted. Such extensions are commonly provided on extruded metal frame members of the type described for such purposes as minimizing distortion of the extrusion, and having all of the rear surfaces of the completed frame lie in a common plane while certain frame portions are of different thickness for greater strength and stiffness in desired areas. Portions 40 and 58 of the frame member define the outer periphery of the frame and their outer surfaces define the outer peripheral surface of the completed frame. Channel flange 42 has an outer surface facing away from web 38 which defines a front peripheral surface of the completed frame.

As shown in FIG. 3, front outer channels 34 on opposite frame members 14 and 18 open toward one another in opposed relationship to define an elongated slideway for receiving opposite peripheral edge portions of flat member 30. This slideway has an entrance between the free ends of frame members 14 and 18 when separable frame portion 12 is separated therefrom. Where flat member 30 is of a size to occupy the entire frame, its top and bottom peripheral edge portions will be received in the front outer channels of frame members 12 and 16. Frame A may be used in a number of different ways as desired by a particular user. Recesses 56 formed by stepped plate portion 54 on each frame member cooperate in the completed frame to define a rectangular recessed area around the open center of the frame for receiving a card, poster or picture of any suitable material. Flat member 30 would then be a clear glass or plastic member for protecting the card, poster or picture. In the alternative, instead of mounting anything in recess 56, the card, poster or picture can be on flat member 30 itself. For example, rigid rectangular plastic members having a design or other indicia thereon may be positioned directly in the slideway by locating its opposite edge portions in front of outer channels 34. Where the frame is elongated in one direction, a plurality of rectangular cards or the like carrying indicia may be positioned next to one another within the slideway.

With reference to FIG. 4, generally L-shaped flat metal connecting members 70 have their legs received between rear inner and outer channels 36 and 64 on frame members 14 and 16, and 16 and 18, and rear inner channel leg 50 is deformed closed at 72 for permanently securing connecting members 70 to the frame members, and forming joints 24 and 26.

Locking members B and C, respectively defining a releasable locking member and a fixed locking member, are secured to frame members 14 and 18 adjacent the terminal ends thereof which form separable joints 20 and 22. In the arrangement shown in FIG. 4, locking member B is in the form of a spring wire having smoothly curved generally U-shaped securing portion 78 spanning and received between rear inner and outer channels 36 and 64 of frame members 14 and 18. Rear inner channel leg 50 is deformed closed at 80 on locking member B for permanently securing same to frame member 14. Locking member B has a latch portion 82 which extends outwardly beyond the terminal end of frame member 14 adjacent joint 22, and extends toward frame member 18. In the preferred arrangement shown, latch portion 82 is formed by bending the wire outwardly and smoothly curving same back upon itself. This smoothly curved shape provides cam surfaces to aid movement of the latch portion between locked and released positions. That portion of locking member B located between deformed portion 80 of rear inner channel leg 50 and latch portion 82 is yieldable outwardly for movement of latch portion 82 from a locked position in FIGS. 4 and 5 to a released position outwardly thereof as shown in FIG. 6. Thus, locking member B is normally yieldably biased inwardly toward locking member C with respect to the other periphery of frame A, and is moved outwardly away from locking member C relative to the outer periphery of frame A in moving to a released position. In its locked position, latch portion 82 engages base 48 of rear inner channel 36 adjacent the terminal end of separable frame portion 12.

Fixed locking member C includes a flat metal plate portion 84 closely received between rear inner and outer channels 36 and 64, and secured therein by deforming channel leg 50 closed thereon as at 86. An integral latch portion 88 extends from plate portion 84 outwardly from the end of frame member 18 and toward latch portion 82 of locking member B. Latch portion 88 is located so that its under surface will substantially abut channel base 48 of separable frame member 12. Latch portion 88 extends outwardly toward latch portion 82 just far enough for firm engagement with channel base 48 on frame member 12 to prevent separation of separable frame member 12, while allowing somewhat of a pivotal release of separable frame member 12 when latch portion 82 is released.

As best shown in FIG. 5, separable frame portion 12 cannot be moved upwardly without permanently unbending latch portion 82 and 88 and making it unsuitable for reuse. Thus, frame member 12 cannot be separated unless latch portion 82 is moved outwardly of its released position. For that purpose, a relatively small limited access opening 90 is provided in flange portion 14 of separable frame portion 12 closely adjacent latch portion 82 of locking member B to release latch portion 82 for separating separable frame portion 12 from the holding frame portion defined by frame members 14, 16 and 18.

As shown in FIG. 6, a special tool D having an elongated narrow working stem 92 is freely receivable through limited access opening 90 for engaging latch portion 82. Tool D is then tilted to the right in FIG. 6 for shifting latch portion 82 to the left in FIG. 6 out of engagement with base 48 of rear inner channel 36 on frame member 12. This makes it possible to begin shifting movement of separable frame portion 12 upwardly and to the left in FIG. 6, and completely remove same from the holding frame portion as shown in FIG. 7. Once latch portion 82 is shifted outwardly out of engagement with channel base 48, the smoothly curved shape of latch portion 82 acts as a cam surface which may engage the intersection of channel base 48 with the terminal end of separable frame portion 12 for camming latch portion 82 toward its released position as separable frame portion 12 is separated. The smoothly curved shape of latch portion 82 also cooperates with this intersection between channel base 48 and the terminal ends of frame portion 12 when frame portion 12 is reassembled. The cooperating action cams latch portion 82 outwardly toward its released position until base 48 is somewhat beneath that latch portion whereupon the latch portion snaps toward it locked position into channel 36 and engages channel base 48 to move and securely hold separable frame portion 12 to frame members 14 and 18, and form separable joints 20 and 22.

Once separable frame portion 12 is separated from the holding portion of the frame, the slideway entrance defined between the terminal ends of frame members 14 and 18 is open so that flat member 30 is slideable from the holding frame portion for replacement. After the flat member has been replaced, separable frame portion 12 can be reassembled to the remainder of the frame. If so desired, tool D can be used for reassembly of separable frame portion 12. However, it is possible to reassemble separable frame portion 12 without the use of the special tool by positioning frame portion 12 at an angle and at least partially locating latch portion 88 within rear inner channel 36 at one end of frame portion 12. Swinging movement of the oter end of frame portion 12 toward latch portion 82 will then cause latch portin 82 to cam outwardly until frame portion 12 is in its desired assembled position spanning the leg ends of the legs defined by frame members 14 and 18 forming the U-shaped holding frame portion.

Instead of using a fixed locking member C having a fixed latch portion 88, it will be recognized that a releasable locking member B can be used for both releasable joints 20 and 22. A limited access opening 90 can be provided adjacent only one latch member or both. Also, it will be obvious that many other releasable or fixed types of locking members can be used.

Mounting means integral with frame A is provided for mounting frame A to a wall or other planar surface. In the arrangement shown, the mounting means takes the form of holes 96 in plate portions 54 of opposite frame members 14 and 18 for receiving screws or other fasteners. The mounting means and fasteners or completely inaccessible behind flat member 30 so that frame A cannot be removed from its mounting position on a planar surface without first removing separable frame portion 12 and sliding flat member 30 therefrom. With frame A mounted on a planar surface, locking members B are completely hidden from view and are inaccessible within the outer surfaces of frame A. A limited access opening through a peripheral surface or wall of frame A provides access to at least one locking member B. In the arrangement shown and described, this limited access opening is in the form of a circular hole 90. However, it will be recognized that other special shapes can be used for providing limited access to releasable latch portion 82 through the frame. The limited access opening is preferably in the outer peripheral surface of the frame and, more specifically, in the outer peripheral portion of separable frame portion 12. Locking member B is preferably resiliently deformable to its released position under a releasing force applied thereto and automatically moves back to its locked position when the releasing force is removed. Rear inner and outer channels 36 and 64 are located intermediate the back surface of frame A and the slideway defined by front outer channels 34 in frame members 14 and 18. Base 48 of rear inner channels 36 on separable frame portion 12 defines abutments integral with frame portion 12 adjacent the opposite ends thereof for cooperating with latch portions 82 and 88 on locking members B and C. Thus, it is not necessary to drill or punch holes in the frame members for cooperation with the locking members.

With reference to FIG. 3, flange 58 completely surrounds the frame and engages the planar surface on which the frame is mounted so that access to the locking members is completely blocked. The limited access opening through flange 58 is the only way of gaining access to a locking member for releasing same. This arrangement makes the frame aesthetically pleasing and the manner of disassembly is not readily discernable.

Instead of forming latch portion 82 on locking member B by bending the wire outwardly and then downwardly and back upon itself, it will be recognized that it can be bent outwardly, and then upwardly and back upon itself. In addition, it is possible to simply bend the wire outwardly and then downwardly without bending it back upon itself. Obviously, many other shapes and forms are possible for the locking members and the latch portions thereof.

FIG. 8 particularly shows one other arrangement wherein a flat metal locking member E is positioned between rear inner and outer channels 36 and 64, and channel leg 50 is deformed closed on same at 80. An elongated angled slit 102 in locking member E provides a resilient latch portion 104 having a latching nose 106 engaging base 48 of channel 36 for locking separable frame portion 12 to the holding frame portion. Insertion of a special tool through limited access opening 90 in separable frame portion 12 makes it possible to engage an abutment surface 110 on latch portion 104 to bend latch portion 104 to the left in FIG. 8 to its shadow line position for disengaging latch nose 106 from channel base 48 and allow separation of separable frame portion 12. The outer surface of latch portion 104 is inclined as at 112 to provide a cam surface aiding in reassembly of separable frame portion 12.

The frame members forming the frame are preferably extruded to the shape shown and described from a suitable metal or plastic, although many other shapes could also be advantageously employed without in any way departing from the overall intent or scope of the present invention.

Limited access opening 90 is located closely adjacent the rear surface of the frame and this means that it is also closely adjacent the planar surface to which the frame is mounted. An ordinary awl or the like cannot be used to release the latch portion because the awl handle will strike the planar surface and prevent manipulation of the awl stem through opening 90. The tool must have a very thin handle or a handle extending at an angle to the stem. Location of opening 90 in separable frame portion 12 itself also increases the difficulty of removing such frame portion by unauthorized persons.

Although the invention has been shown and described with respect to certain preferred embodiments, it is obvious that equivalent alterations and modifications will occur to others skilled in the art upon the reading and understanding of this specification. The present invention includes all such equivalent alterations and modifications insofar as they come within the scope of the appended claims or the equivalents thereof.

Having thus described by invention, I now claim:

1. A display holder for cards, pictures, posters and the like comprising: a substantially rectangular frame formed by a plurality of frame members connected together at corner joints, said frame having front, back and outer peripheral surfaces, one of said frame members defining a separable frame portion and the other of said frame members defining a holding frame portion, said holding frame portion having a slideway for slidably receiving the edge portions of a flat member and having a slideway entrance normally closed by said frame portion; said separable frame portion being separably connected to said holding frame portion by separable joints at least one of which includes a releasable locking member releasably locking said separable frame portion to said holding frame portion and being movable between locking and released positions, said releasable locking member being located completely beneath said surfaces and normally being biased to said locking position in a direction generally inwardly of said frame relative to said outer peripheral surface; and, a limited access opening in said peripheral surface for providing access to said releasable locking member with a special tool to move same to said released position.

2. The holder as defined in claim 1 wherein said releasable locking member is secured to said holding frame portion and said access opening is in said separable frame portion.

3. The holder as defined in claim 1 including mounting means on said holding frame portion for mounting same to a wall with said back peripheral surface engaging the wall, and said mounting means normally being covered by a flat member received in said slideway.

4. The holder as defined in claim 1 wherein said releasable locking member is permanently secured to said holding frame portion.

5. The holder as defined in claim 1 wherein said holding portion has an outwardly opening channel between said slideway and said back surface and said releasable locking member is secured in said channel by deforming a portion of said channel closed thereon.

6. The holder as defined in claim 5 wherein said releasable locking member comprises an elongated wire having a free end portion extending beyond the end of said holding portion to which it is secured, and said free end portion being bent to define a latch portion.

7. A holder for a flat member comprising: a frame including separable and holding frame portions, said holding frame portion being generally U-shaped and including opposite legs having spaced-apart leg ends, said holding frame portion including a slideway for receiving edge portion of a flat member and having a slideway entrance between said leg ends normally closed by said separable frame portion; locking members secured to said legs and having latch portions extending outwardly of said leg ends toward one another, at least one of said latch portions normally being resiliently biased toward the other said latch portion to a locking position and being movable away from said other latch portion to a released position; and, said separable frame portion having abutments cooperating with said latch portions for releasably locking said separable frame portion to said leg ends.

8. The holder as defined in claim 7 including a limited access opening in said frame for providing access to said latch portion for moving same to said released position.

9. The holder as defined in claim 8 wherein said opening is in said separable frame portion.

10. The holder as defined in claim 7 wherein said slideway is on one side of a web and said locking members and abutments are on the opposite side of said web, said holding frame portion having mounting means thereon for mounting same to a planar surface, and said frame having a closed outer periphery blocking access to said locking members when said frame is mounted to a planar surface.

11. The holder as defined in claim 10 including a limited access opening in said outer periphery of said separable frame portion shaped to provide access therethrough only with a special tool for engaging and moving said one latch portion to said released position.

12. A generally rectangular frame for display cards or the like, said frame being formed by a plurality of frame members having the same cross-sectional shape including inner and outer channels disposed in spaced relationship on opposite sides of a web and opening toward one another parallel to said web, a flange extending outwardly from said web on the same side thereof as said inner channel and spaced therefrom toward said outer channel, said flange extending outwardly from said web a distance approximately at least as great as the width of said inner channel, said frame members being assembled into said frame with said outer channels located at the front outer periphery of said frame and said inner channels located at the rear of said frame, one of said frame members being a separable frame member separably connected to other of said frame members at corner miter joints, at least one of said miter joints including a releasable locking member having a securing portion positioned in said inner channel of one said other frame member and a portion of said inner channel on said one other frame member being deformed closed on said securing portion, said locking member having a latch portion extending from said one other frame member into said inner channel of said separable frame member, said latch portion being resiliently movable to a released position out of said inner channel, and a limited access opening in said flange of one of said frame members for providing access therethrough with a special tool to move said latch portion to said released position.

13. The frame as defined in claim 12 wherein said limited access opening is in said flange on said separable frame member.

14. A holder for a flat member comprising: a frame including separable and holding frame portions, said holding frame portion being generally U-shaped and including opposite legs having spaced-apart leg ends, said holding frame portion including a slideway for receiving edge portions of a flat member and having a slideway entrance between said leg ends normally closed by said separable frame portion, said holding frame portion including mounting means for mounting same to a planar surface; separable joints releasably connecting said separable frame portion to said holding frame portion, at least one of said joints including a releasable locking member movable between locked and released positions, said locking member in said locked position thereof cooperating with said separable frame portion and one of said legs for preventing separation of said separable frame portion from said holding frame portion, said frame having outer walls and said locking member being inaccessably located between said outer walls and a planar surface on which said frame is mountable; and, a limited access opening in one of said walls for providing access therethrough to said locking member with a special tool for moving said locking member to said released position to separate said separable frame portion from said holding frame portion and allow insertion or removal of a flat member with respect to said slideway while said holding frame portion remains mounted on a planar surface.

15. The holder as defined in claim 14 wherein said locking member is secured to said holding frame portion and in said locked position thereof cooperates with an integral abutment on said separable frame portion.

16. The holder as defined in claim 14 wherein said frame is formed of extruded metal frame members all having the same cross-sectional shape including a rear inner channel with which said locking member cooperates to releasably secure said separable frame portion to said holding frame portion.

17. The holder as defined in claim 16 wherein said rear inner channel on said one leg of said holding frame portion is deformed closed on said locking member to secure same to said one leg, and said locking member having a latch portion extending beyond said one leg end for cooperation with said rear inner channel on said separable frame portion.

18. The holder as defiend in claim 17 wherein said limited access opening is in said separable frame portion.

* * * * *